(12) United States Patent
Waszak et al.

(10) Patent No.: US 6,459,038 B1
(45) Date of Patent: Oct. 1, 2002

(54) TWO-PIECE UP-SPOUT FITTING FOR WIRING DUCT

(75) Inventors: Dennis J. Waszak, Wheaton; William A. Bernard, Darien, both of IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 09/942,228

(22) Filed: Aug. 29, 2001

(51) Int. Cl.[7] ................................................ H02G 3/04
(52) U.S. Cl. ........................ 174/48; 174/68.3; 174/135; 174/49
(58) Field of Search ............................ 174/48, 49, 60, 174/67, 68.3, 95, 99 R, 135, 100, 69, 72 A, 72 R, 136; 220/3.2, 3.8, 3.3, 4.02, 4.01; 52/220.1, 220.3, 220.5, 220.7

(56) References Cited

U.S. PATENT DOCUMENTS

| | | | |
|---|---|---|---|
| 3,721,762 A | | 3/1973 | Gooding |
| 3,814,833 A | | 6/1974 | Yamada et al. |
| 3,836,936 A | * | 9/1974 | Clement ...................... 174/48 |
| 3,844,440 A | | 10/1974 | Hadfield et al. |
| 4,203,639 A | | 5/1980 | VandenHoek et al. |
| 4,596,095 A | | 6/1986 | Chalfant |
| 4,720,768 A | | 1/1988 | Schindele |
| 4,922,672 A | * | 5/1990 | Bartee et al. .................. 174/48 |
| 4,953,735 A | * | 9/1990 | Tisbo et al. .................. 174/101 |
| 5,161,580 A | * | 11/1992 | Klug ........................ 174/68.3 |
| 5,469,893 A | * | 11/1995 | Caveney et al. ............. 174/101 |
| 5,728,976 A | * | 3/1998 | Santucci et al. ............. 174/135 |
| 6,037,543 A | * | 3/2000 | Nicoli et al. ................. 174/101 |
| 6,049,040 A | * | 4/2000 | Biles et al. .................. 174/101 |
| 6,284,975 B1 | * | 9/2001 | McCord et al. ............... 174/49 |

* cited by examiner

*Primary Examiner*—Anthony Dinkins
*Assistant Examiner*—Angel R. Estrada
(74) *Attorney, Agent, or Firm*—Robert A. McCann; Jay A. Saltzman; Christopher S. Clancy

(57) ABSTRACT

An up-spout fitting useful for mounting onto various duct sections of a cable duct system having a base and side walls with a hinge arrangement. The up-spout fitting includes at least a pair of up-spout fitting halves. Each fitting half includes, a base element having a complementary hinge arrangement on at least one side thereof and side walls projecting upward from the base element and defining an outlet aperture that is open on at least one side of the fitting half and open on both a bottom and a top of the fitting half. The pair of fitting halves are mountable onto the duct section with respective outlet apertures facing each other to form a common outlet aperture substantially closed on the sides while remaining open on both the top and bottom to allow cable passage therethrough. By making the side walls of each fitting L-shaped, rotational opening of individual fitting halves can be achieved without interference with the other fitting half or cables located within the duct and fitting. This allows selective opening of one or both fitting halves while still gaining access to the cable receiving channel of the duct section. Also, due to the shape and location of mounting brackets on the outlet aperture of the fitting, additional components can be mounted in multiple orientations.

20 Claims, 10 Drawing Sheets

TWO-PIECE UP-SPOUT FITTING FOR WIRING DUCT

BACKGROUND OF THE INVENTION

1. Field of Invention

The present invention generally relates to a fitting for a wiring cable duct system. More specifically, the invention relates to a two-piece up-spout fitting that hingedly mates to a cable wiring duct section to allow easy access to a cable channel.

2. Description of Related Art

Typical duct or raceway systems consist of a U-shaped base member and a cover that may be hinged, snap latched, or otherwise engageable with the base. Such systems often include various straight duct sections and special fittings that adapt the system to numerous configurations. These fittings can be right angle fittings, T-fittings or other shaped fittings designed to route cabling in various directions.

In many applications, such wiring duct and raceways systems are provided above telecommunications racks, within suspended ceilings and the like. However, such wiring duct and raceway systems are also useable in underfloor applications, particularly when used in rooms equipped with suspended floor tiling systems.

When used in suspended ceilings and above rack applications, various conventional angle fittings and T-fittings can adequately route cabling within the duct system from a horizontal configuration vertically downward, such as to allow interconnection of the cabling with a telecommunications rack. While such fittings could be used in an inverted orientation to work in underfloor applications or when the duct system is deployed below communications racks, there is a need for a better fitting, useful as an up-spout to allow cabling to extend from horizontal runs of duct sections vertically upward towards a telecommunications rack.

SUMMARY OF THE INVENTION

It is an object of the invention to provide an improved wiring or cable duct system that is capable of directing cabling from horizontal runs of duct sections vertically upward at nearly any position along the horizontal run.

It is another object of the invention to provide a two-piece up-spout fitting that allows access to cable wiring within the duct system without the need to remove the fitting entirely from the duct section and without requiring disconnection of the cabling routed through the wiring duct system.

It is yet another object of the invention to provide a two-piece up-spout fitting in which individual fitting halves can be separately hinged on side walls of a wiring duct section in place of a cover to allow ready access to either or both sides of the wiring duct section.

It is another object of the invention to form the individual fitting halves with a complementary opening profile that allows pivoting of the individual fitting halves without interference with each other or with cables that may be provided within the outlet aperture of the fitting.

It is another object of the invention to provide a symmetrical two-piece up-spout fitting in which each piece can interchangeably fit either side of the duct section.

It is yet a further object of the invention to provide an up-spout fitting with an outlet aperture that allows mating components to be installed onto the up-spout fitting in multiple orientations.

Various ones of the above and other objects of the invention are achieved by an up-spout fitting useable with a duct section of a cable wiring system having a base of a predetermined width and side walls defining a cable receiving channel with the side walls having a hinge arrangement The up-spout fitting includes at least a pair of up-spout fitting halves. Each fitting half comprises: a base element having a complementary hinge arrangement on at least one side thereof; and side walls projecting upward from the base element and defining an outlet aperture that is open on at least one side of the fitting half and open on both a bottom and a top of the fitting half. The pair of fitting halves are mountable onto the duct section with respective outlet apertures facing each other to form a common outlet aperture substantially closed on the sides while remaining open on both the top and bottom to allow cable passage therethrough.

Various ones of the above and other objects of the invention are also achieved by a method of mounting an up-spout fitting to a duct section of a cable wiring duct system, the duct section including a base wall and side walls that define a cable receiving channel therein, the side walls having a hinge arrangement thereon. The method includes: mounting fitting halves of the up-spout fitting onto duct section side walls of at least one duct section of the cable wiring duct system; selectively opening individual ones of the two fitting halves by pivoting the individual ones about the hinge arrangement without interference with the other fitting half or cables located within the up-spout fitting to gain access to the cable receiving channel from either longitudinal side of the duct section; and returning the individual ones of the fitting halves to a closed position that covers the cable receiving channel.

BRIEF DESCRIPTION OF THE DRAWINGS

The foregoing and further objects, features and advantages of the present invention will become apparent from the following description of preferred embodiments with references to the accompanying drawings, wherein:

FIG. 4A is a partial enlarged view of a hinged latch assembly on one side of the duct section;

FIG. 4B is a partial enlarged view of a hinged latch assembly on the other side of the duct section;

DETAILED DESCRIPTION OF PREFERRED EMBODIMENTS

Figure 1:
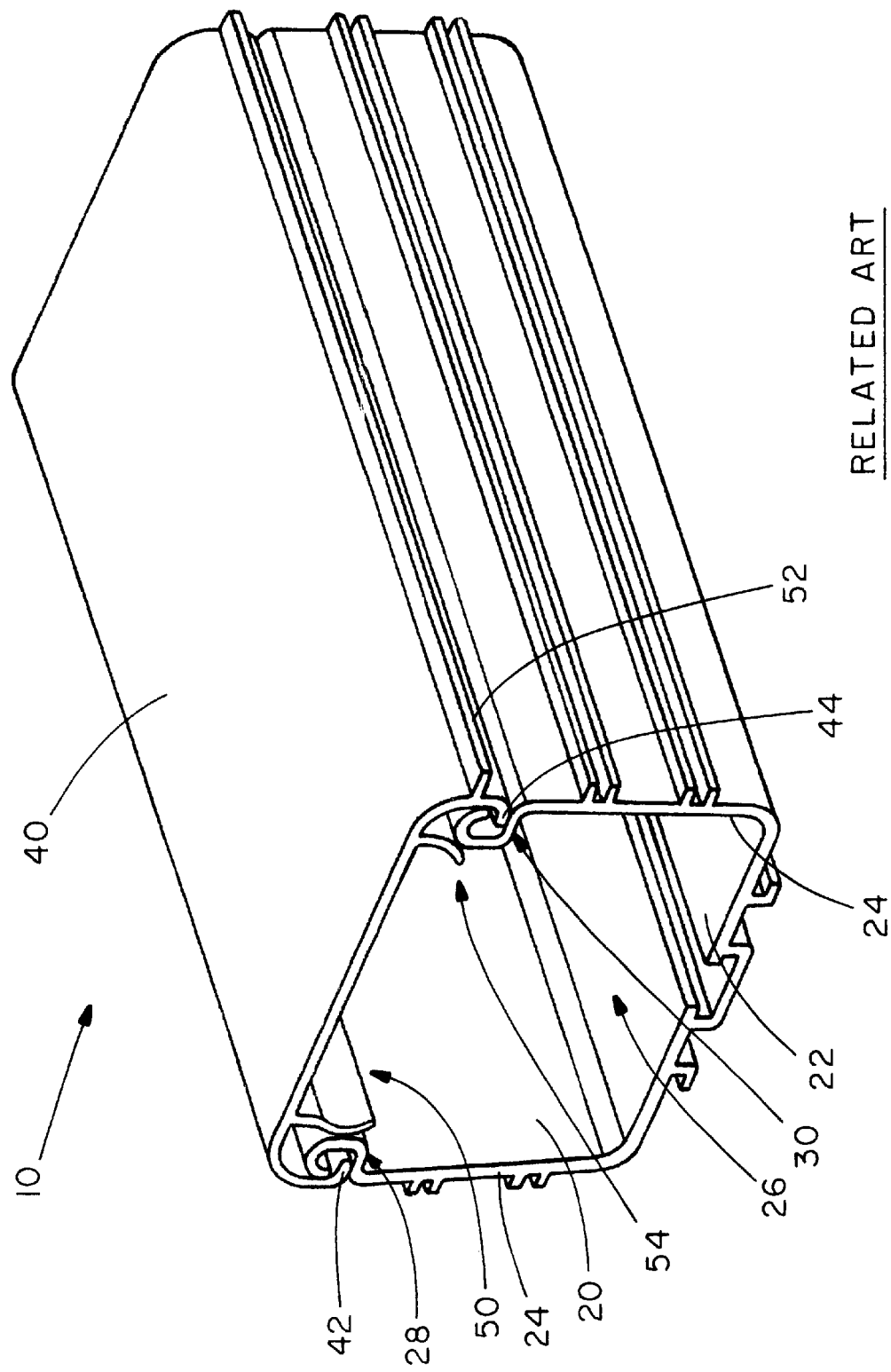
FIG. 1 is a perspective view of an exemplary wiring duct section of a wiring duct system according to the invention.
Figure 2:
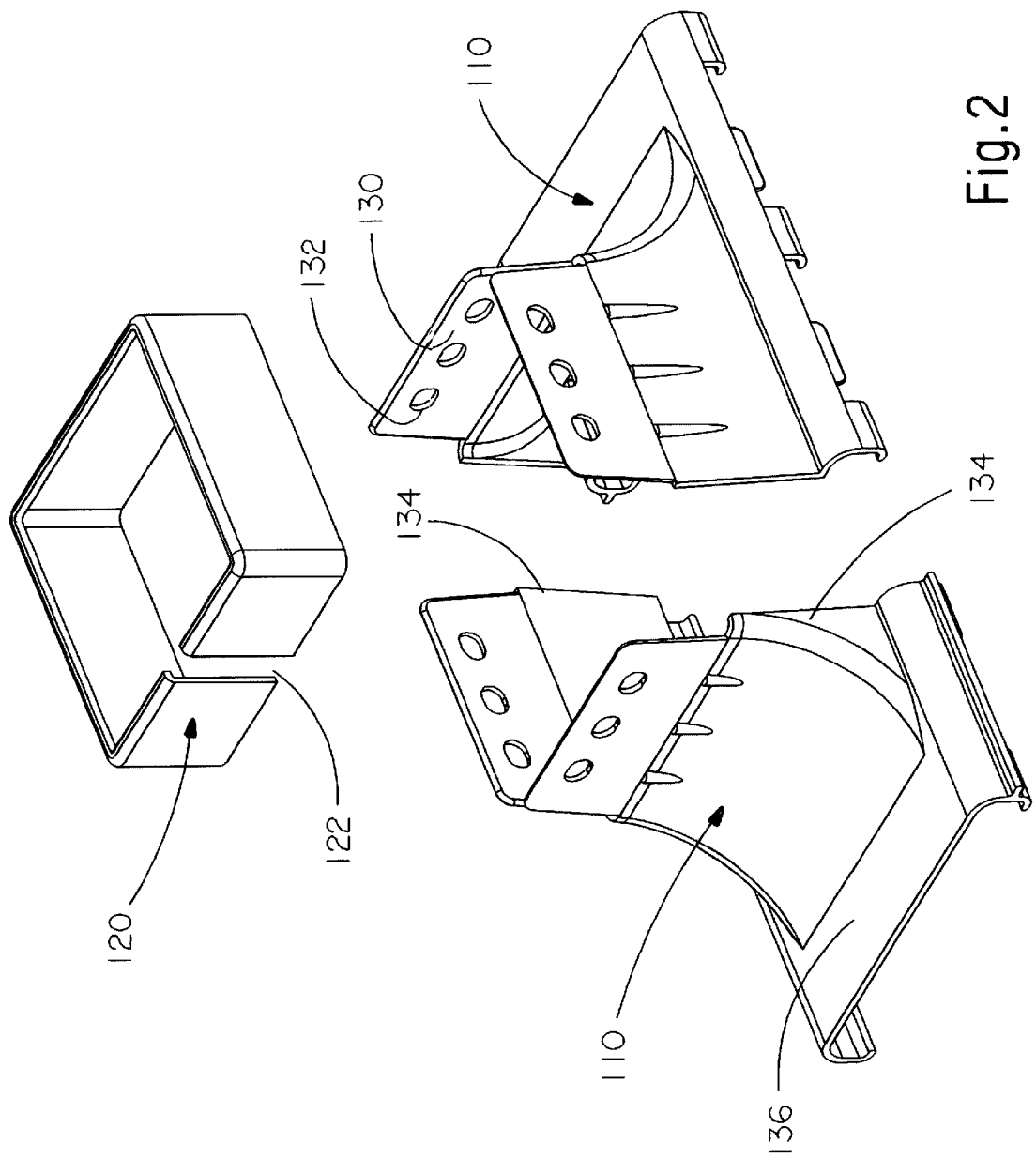
FIG. 2 is an exploded perspective view of an exemplary up-spout fitting according to the invention.

An embodiment of a wiring duct system with up-spout fitting according to the invention will be described with reference to FIGS. 2–11. The up-spout fitting is mountable on an exemplary duct section 10, shown in FIG. 1. Such a duct section is further described in co-pending U.S. Ser. No. 09/867,909, the disclosure of which is incorporated herein in its entirety, and may be made of any suitable material, preferably a plastic material such as ABS, PVC, or the like.

Exemplary duct section 10 includes a U-shaped base 20 and a removable cover 40 with a hinge arrangement 28, 30. Base 20 includes a bottom wall 22 and side walls 24, which may be integrally formed or otherwise affixed together. Bottom wall 22 and side walls 24 define a cable receiving channel 26 for wiring or the like. Distal ends of side walls 24 include identical but reversed base section hooks 28, 30 that form the hinge arrangement for cover 40. Base section hooks 28, 30 are formed by a first inwardly directed flange portion and a second portion formed as a reverse "J". The provision of base section hooks 28, 30 allow for reversible installation of cover 40 and the ability to hingedly open cover 40 in either of opposite directions.

Cover 40 is generally planar with curved end portions that form a hinge end section and a latching end section. The hinge end section includes a hook 42 that corresponds to and is received within hook 28. A flange 50 is also formed on cover 40 and spaced inwardly from hook 42. Flange 50 cooperates with hook 42 to engage with hook 28 and hingedly secure the cover to base 20. The latching side of cover 40 also includes a flange 54 spaced from hook 44 that acts in conjunction therewith to engage hook 30. A latch 52 extends outward from hook 44 that allows a user to release cover 40 from base 20 by lifting up on latch 52 while pushing in on side wall 24.

When the wiring duct system is configured for an underfloor or under rack configuration, it is often necessary to route various cables from horizontally extending cable pathways defined by various interconnected duct sections vertically upward, such as to allow interconnection with a telecommunications rack. To achieve this routing, one or more duct sections of the wiring duct system can be provided with the inventive up-spout fitting 100 shown in FIGS. 2–3.

Up-spout fitting 100 includes two fitting halves 110 and may include a fitting cap 120. The two halves 110 are preferably identical and mounted as mirror images as shown, with one being rotated 180° relative to the other. The fitting halves 110 each preferably include an L-shaped bracket 130 having attachment members, such as holes 132, provided on side walls 134 that extend from a base element 136 of the fitting. Preferably, the side wall 134 on each fitting that extends in the direction of cable receiving cavity is radiused to provide bend radius control to cables transitioning from the horizontal duct section 10 vertically upward into the up-spout fitting 100. By making the component halves identical, the number of parts required in inventory can be reduced. Also, by making halves 110 with an L-shaped opening defined by side walls 134 and brackets 130, the individual fitting halves can be pivoted away from a closed to an open position without interference with the other fitting half 110 or with cables present within the fitting aperture 140.

Figure 3:
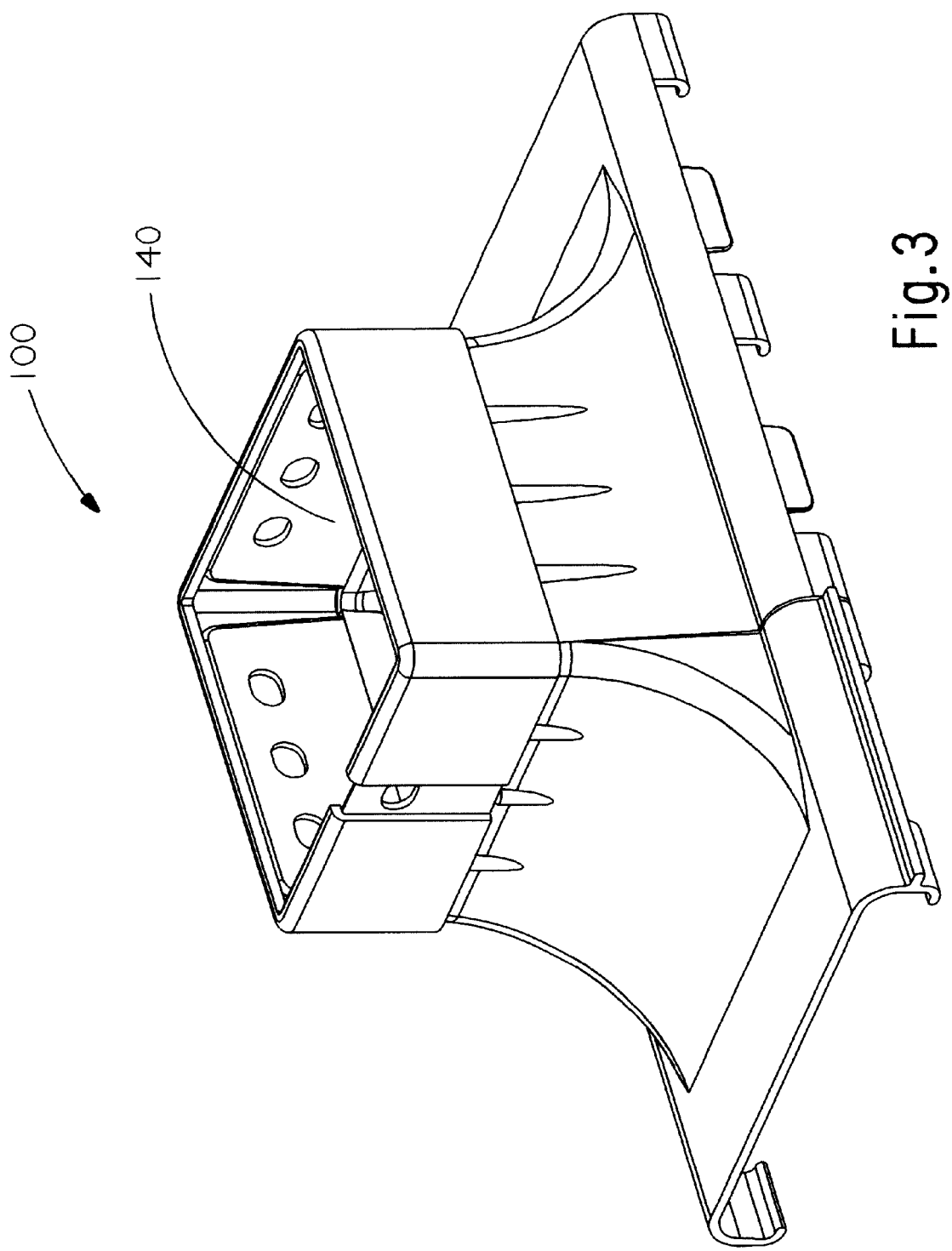
FIG. 3 is an assembled perspective view of the up-spout fitting of FIG. 2.

When the two halves 110 are installed and positioned in the closed position shown in FIG. 3, an outlet aperture 140 of a predetermined size is formed. Cap 120 is sized to fit around L-shaped brackets 130 and outlet 140. Cap 120 preferably has a slotted opening 122 that allows installation regardless of whether cables are already routed through the spout by allowing such cables to pass through the opening. Cap 120 retains the fitting in the closed position and provides bend radius control protection to eliminate opportunities from chaffing of cables, such as fiber optic cables, carried within fitting 100.

Figure 4:
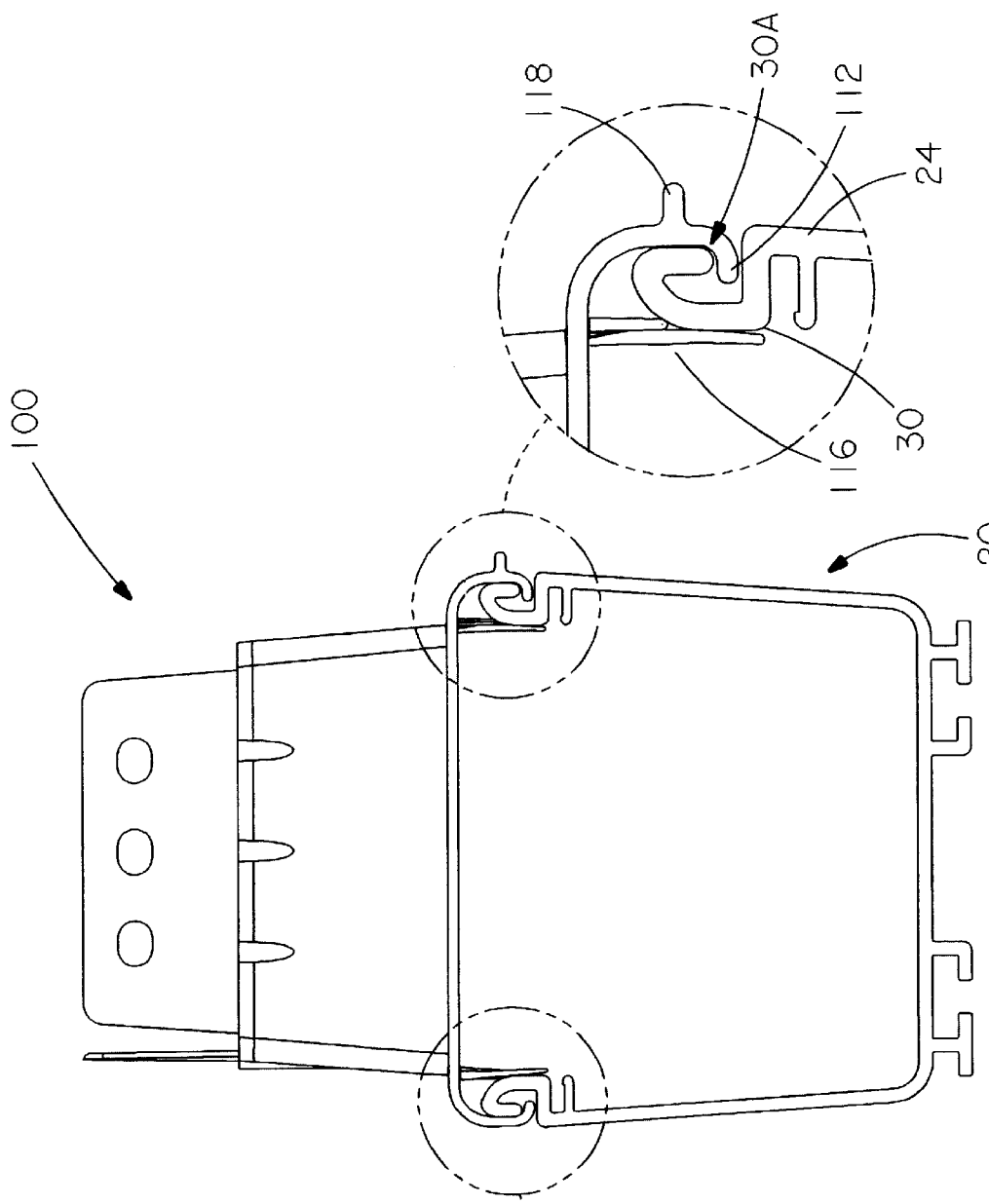
FIG. 4 is an end view of an exemplary up-spout fitting according to the invention mounted onto a duct section.

Up-spout fitting 100 is mountable on base 20 as shown in FIGS. 4, 4A and 4B. As best shown in FIGS. 4A and 4B, each fitting half 110 is hingedly mounted on the hook structure 28, 30 of base 20. The fitting halves have mounting structure similar to that provided in cover 40. That is, each fitting half includes a complementary hinge arrangement that rotatably mates with the hinge arrangement on the duct section side walls. An exemplary hinge arrangement is made up of hook elements 112 and one or more flanges or tensioning ribs 114 that maintains tension with hook 28, 30 to ensure a secure snap fit with the side walls 24. As shown in FIG. 4B, one side of the half may use shorter locating ribs 116 that mate with corresponding hooks 28, 30 of base 20 to ensure a proper snap fit when hooks 112 are urged onto hooks 28, 30 A latch 118 may be provided on one side of fitting half 110 to assist in opening of the fitting half.

The tip 28A of the reverse "J" shaped hook 28 forms a hinge point that mates with hook 112 to allow pivotal hinging of fitting half 110 (see FIG. 4A) by allowing hook 112 to be guided into the cavity formed by the J-shaped hook 28. Similarly, the tip 30A of the reverse "J" shaped hook 30 forms a locking feature that cooperates with the innermost tip of hook 112 to snap lock the fitting half onto the base 20. By lifting up on latch 118, slight flexure of hook 112 begins until fitting half 110 is released from the locking feature 30A (see FIG. 4B). Alternatively, release can be achieved by slight inward pressure applied to side wall 24 to deflect it inward.

Figure 5:
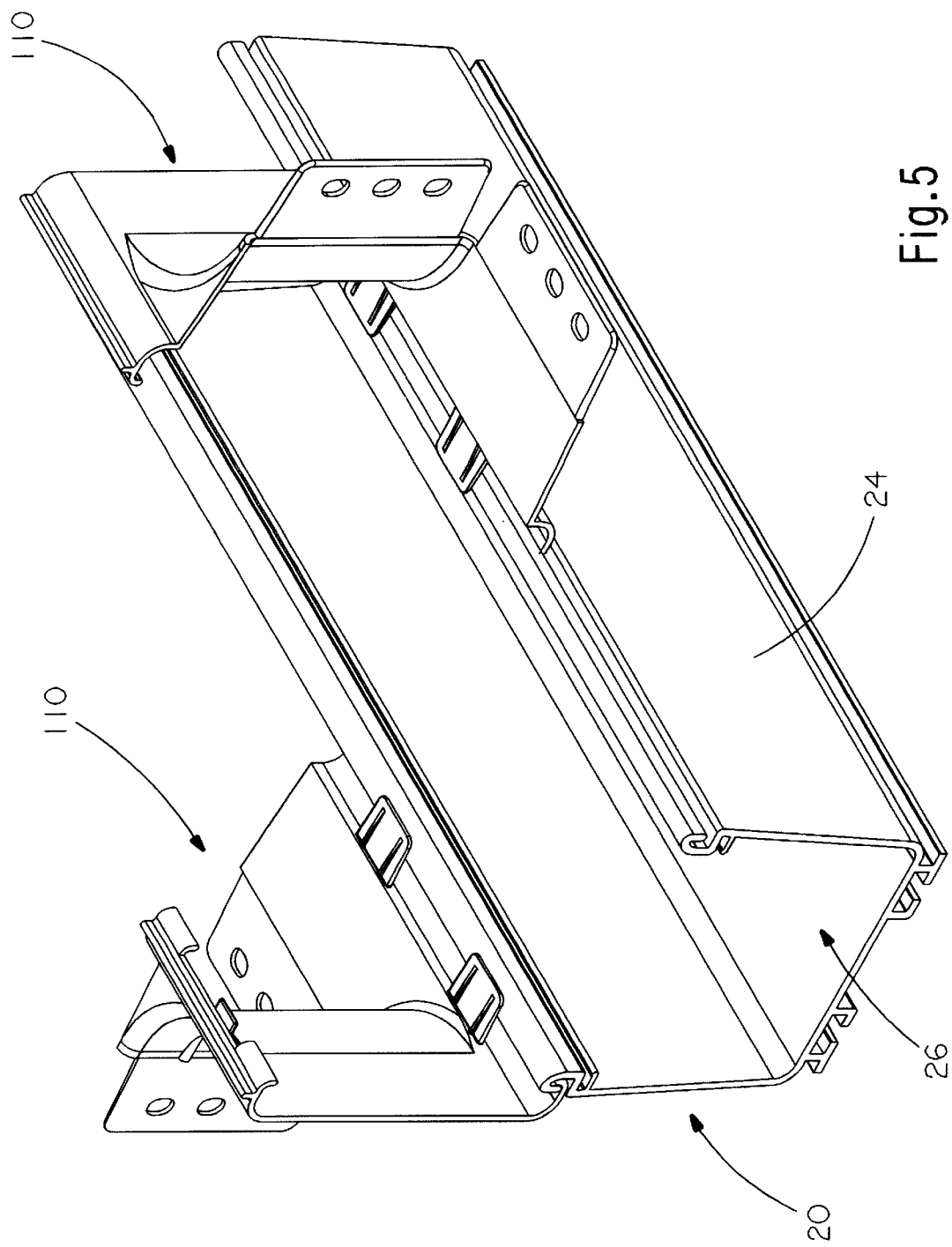
FIG. 5 is a perspective view of the up-spout fitting of FIG. 3 shown in a fully open hinged position in which both halves of the up-spout fitting are pivoted out of the way to fully expose the channel of the duct section to allow cable access.
Figure 6:
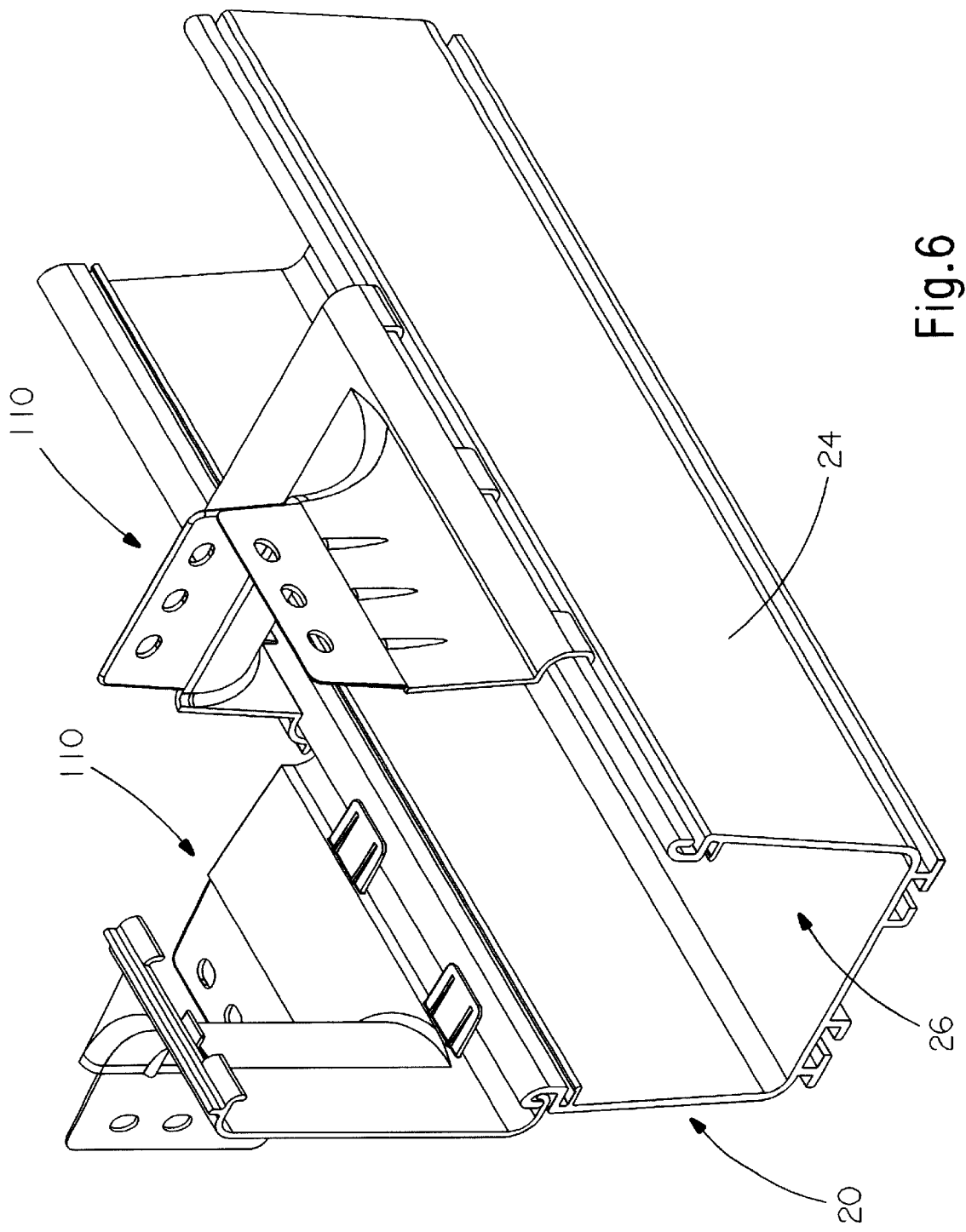
FIG. 6 is a perspective view of the up-spout fitting of FIG. 3 shown in another position in which only one half of the up-spout fitting is pivoted out of the way to partially expose the channel of the duct section to allow cable access.
Figure 7:
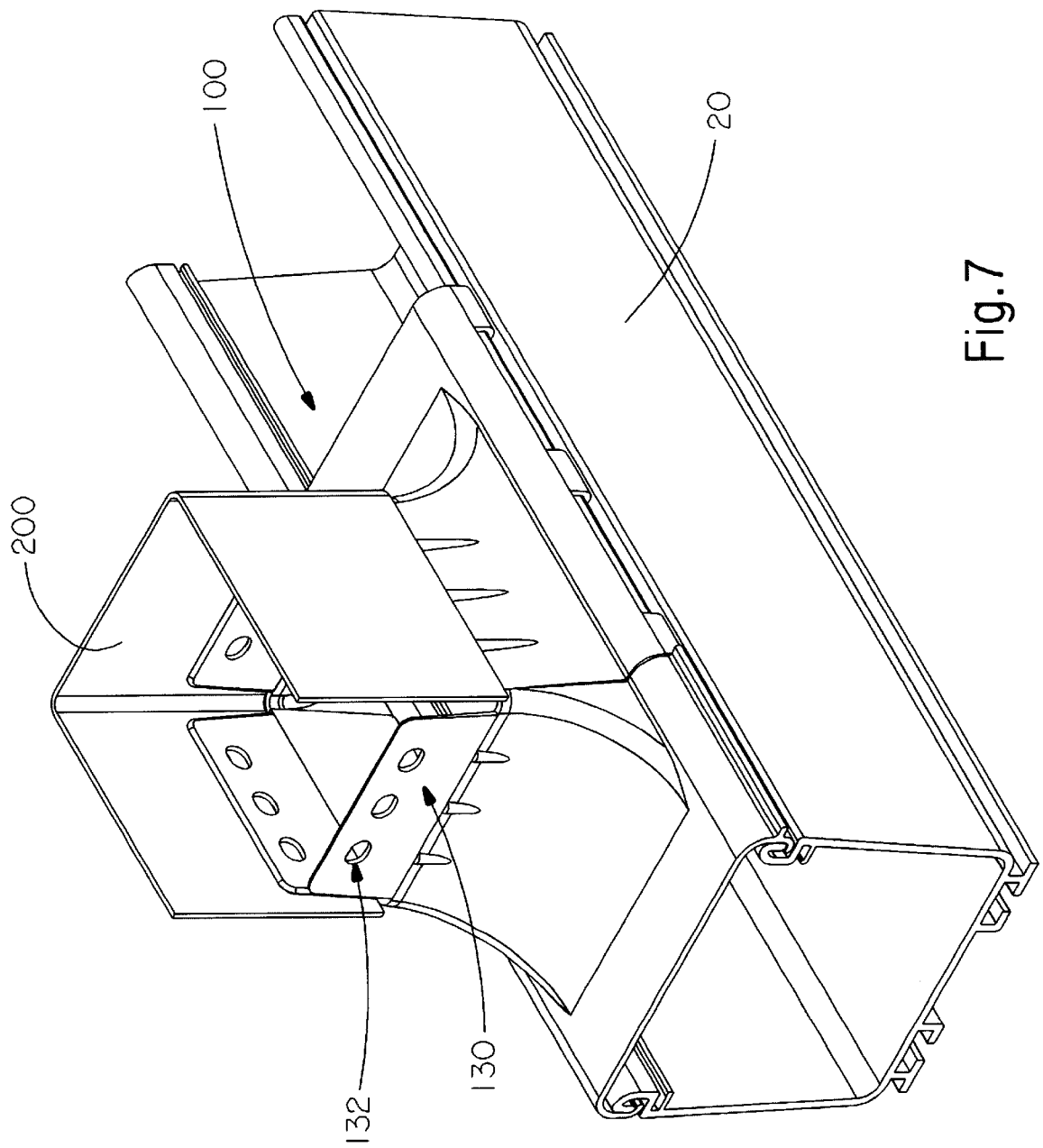
FIG. 7 is a perspective view of the up-spout fitting of FIGS. 5–6 shown fully closed and with another duct system component mounted to the outlet of the up-spout fitting.
Figure 8:
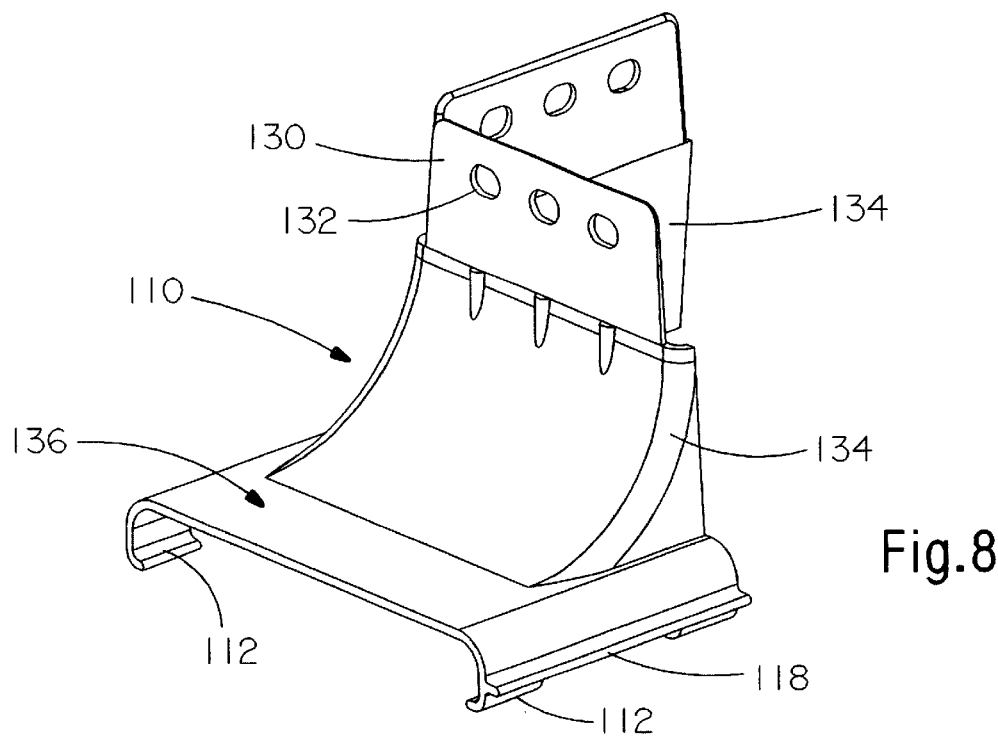
FIG. 8 is an enlarged view of an exemplary up-spout fitting half according to the invention.

By forming the split symmetrical fitting halves 110 with an L-shaped opening formed by L-shaped side walls 134, each individual fitting half 110 is able to be independently hingedly rotated between open and closed positions as shown in FIGS. 5–7. That is, either one or both halves 110 are able to be rotated approximately 90° about hooks 28, 30 to provide access to the cable receiving channel 26. This allows addition or removal of cables to an existing installation without requiring feeding through a fitting hole. Due to the construction of each fitting, rotation may be able to provide full width access to the channel 26. Moreover, due to the individual action, access can be provided even when the duct section 10 is mounted up against a wall or other obstacle because the oppositely located fitting half 110 can still be rotated to allow cable access.

When up-spout fitting 100 is in the closed position shown in FIG. 7, other wiring duct system components can be mounted thereon, such as exemplary duct channel 200 illustrated. However, other components, such as cap 120 or other fittings can also be mounted. Attachment may be by slip fit, or may be by snap rivets, screws or other affixing. In the case of rivets, rivets can be applied through openings 132. By making outlet 140 with a symmetrical perimeter, such as the square configuration shown, the wiring duct system components mounted thereon can be mounted in several orientations. That is, by providing a square profile, the component can be mounted in any of four orientations. Additionally, outlet aperture 140 may have a similar profile as that of base 20 or may have a reduced size, such as going from a 4" square duct section profile to a 2" square profile.

FIGS. 8–13 show enlarged views of the up-spout fitting 100 and cap 120 to illustrate more specific details of a preferred exemplary embodiment. As shown, each side of fitting half 110 may have several hooks 112 of a width H spaced across the length. The exact size, number and spacing is not critical and may be modified to meet individual needs. Alternatively, full width hooks 112 can be substituted. Similarly, tensioning ribs 114 and locator ribs 116 can be of a suitable width, number and spacing, depending on application and desired properties.

Figure 9:
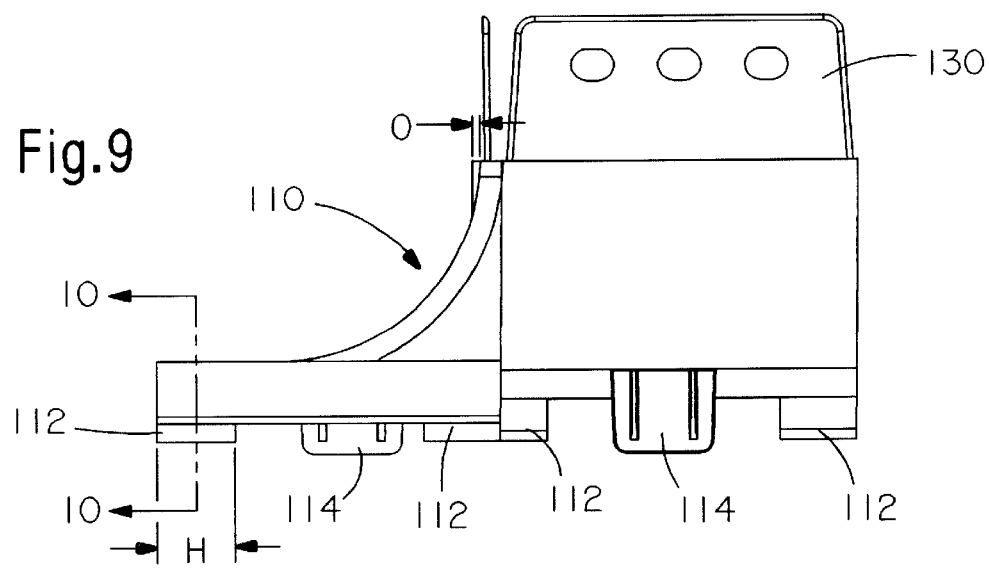
FIG. 9 is a side view of the up-spout fitting of FIG. 8.

As shown in FIG. 9, brackets 130 are preferably offset from the periphery of side walls 134 by an offset distance O, which corresponds substantially to the thickness of a contemplated component/fitting that is to be attached to fitting 100. This enables the outer periphery of the component being attached to match the periphery of fitting 100.

Figure 10:
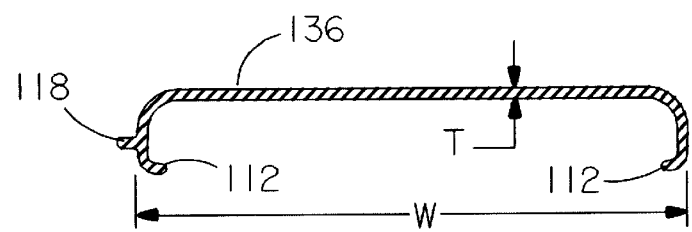
FIG. 10 is a cross-sectional view of the up-spout fitting of FIG. 9 taken along lines 10—10.
Figure 11:
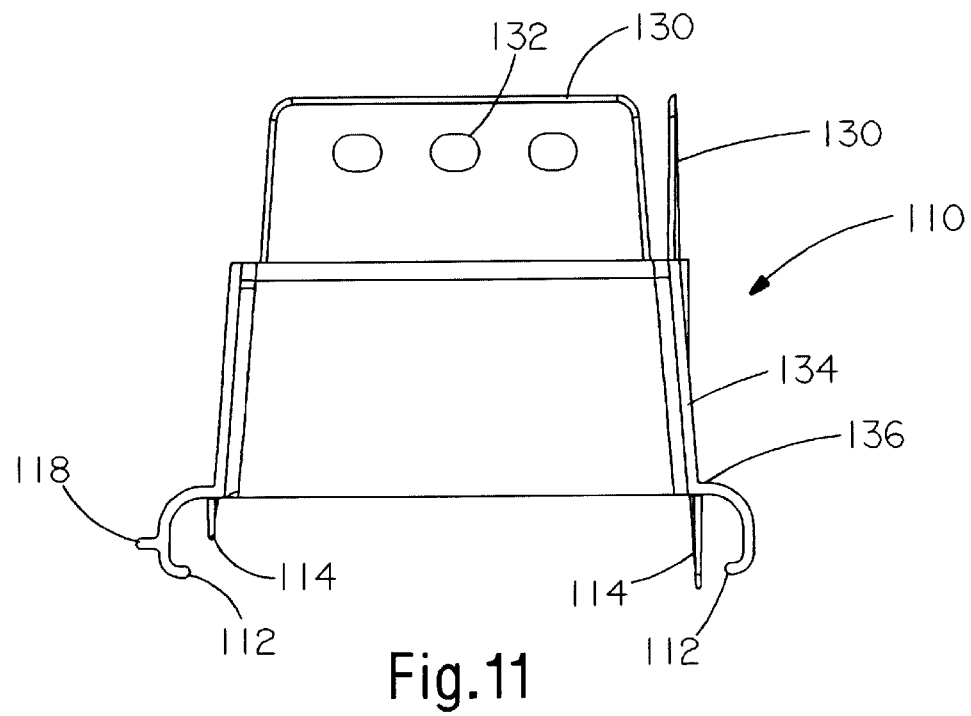
FIG. 11 is an end view of the up-spout fitting of FIG. 8.
Figure 12:
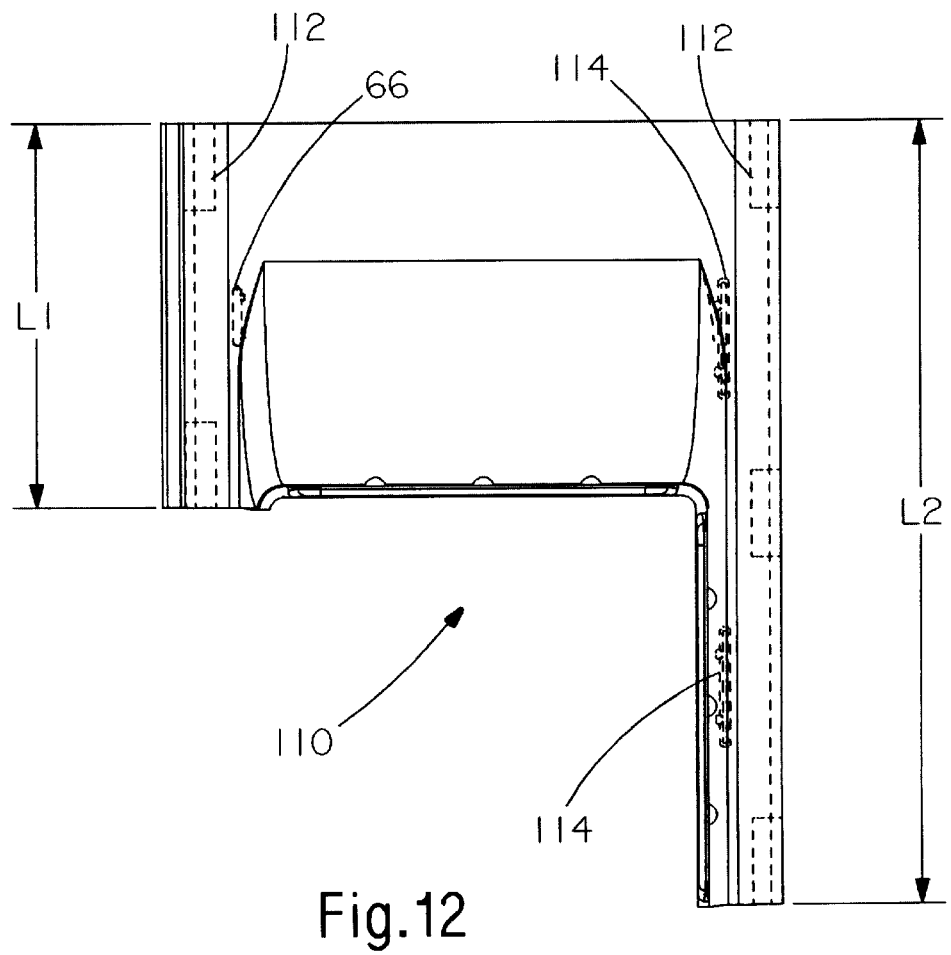
FIG. 12 is a top view of the up-spout fitting of FIG. 8.

As shown in FIG. 10, base section 136 of fitting 100 has a predetermined thickness T selected based on desired properties, such as material selected, strength, weight or other criteria. Width W corresponds to the size of duct section 10 to which the fitting 100 is to be mated.

Figure 13:
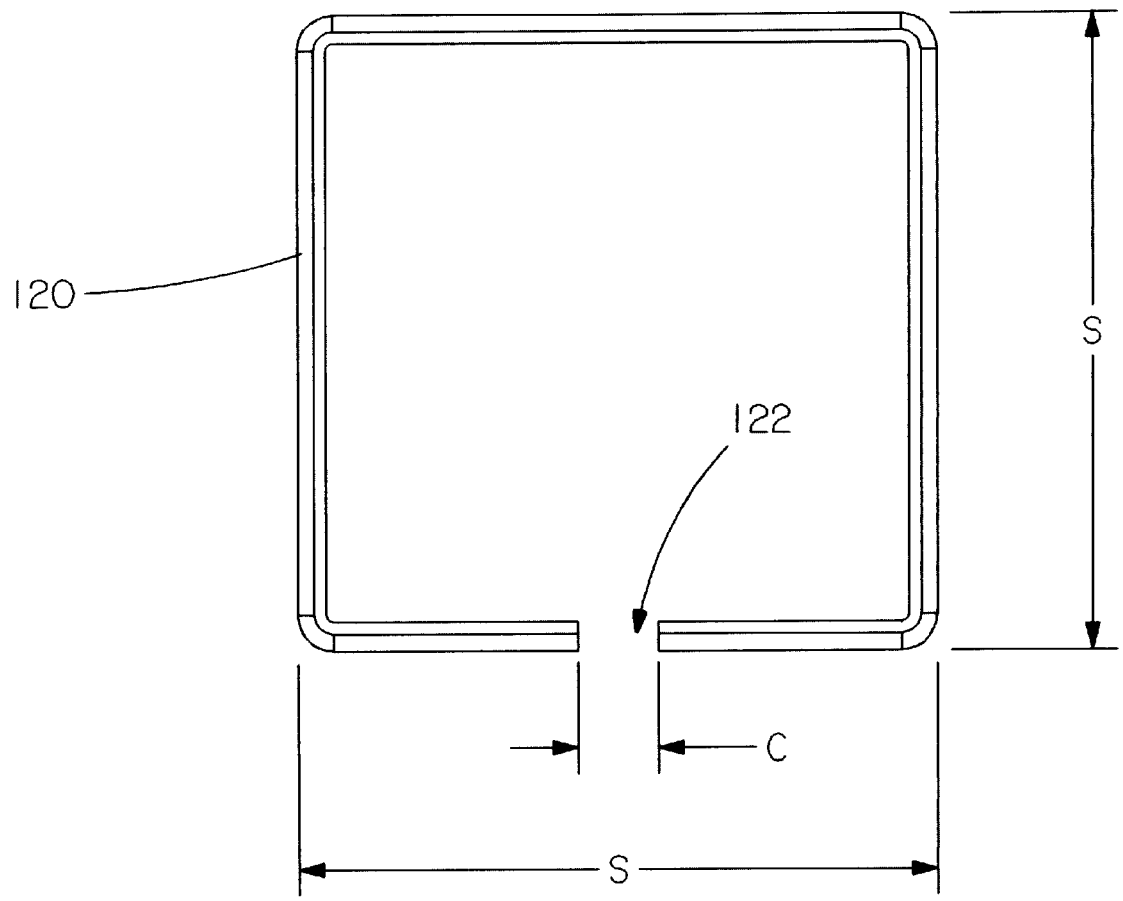
FIG. 13 is a top view of a cap mountable to the outlet of the up-spout fitting of the invention.

An exemplary cap 120 is better illustrated in FIG. 13. Cap 120 has an inner diameter sized to fit over brackets 130 and outlet aperture 140. The outer diameter S may be selected to match the remainder of fitting 100 or may be larger for strength or other purposes. Slot opening 122 has a gap of C inches, which is selected based on desired installation ease. Gap C should be at least the width of a single cable in the system, but may be wider to allow easier installation on or removal from an existing configuration in which a plurality of cables are run through fitting 100.

While indicated to be mounted by snap fit over the duct section, fitting 100 may also then be slid along longer sections of the duct once located within hooks 28, 30. This can be achieved before or after cables are located within fitting 100. Also, while shown with a square outlet 140, similar benefits can be achieved with other profiles, including rectangular, oval or circular. In the case of a circle, each fitting half would have side walls that form half of the outlet aperture (half-circle in this case), with ends at a 45° angle to the duct section 10 side walls to allow the individual opening and closing of fitting halves 110 without interference. Further, the hinge arrangement shown is merely illustrative. Any conventional or subsequently developed hinge arrangement that allows pivotal rotation of the fitting halves about the duct section may be substituted.

While the invention has been shown and described in conjunction with specific exemplary embodiments, the invention is not limited to these. It will be obvious to those skilled in the art that changes and modifications may be made without departing from the teachings of this invention and that the matter set forth in the foregoing description and accompanying drawings is offered by way of illustration only and not as a limitation. The actual scope of the invention is intended to be defined in the following appended claims.

What is claimed is:

1. An up-spout fitting for a duct section of a cable wiring duct system, the duct section including a base of a predetermined width and side walls defining a cable receiving channel with the side walls having a hinge arrangement, the up-spout fitting comprising at least a pair of up-spout fitting sections, each fitting section comprising:
    a base element having a complementary hinge arrangement on at least one side thereof, and
    side walls projecting upward from the base element and defining an outlet aperture that is open on at least one side of the fitting section,
    wherein the pair of fitting sections are mountable onto the duct section with respective outlet apertures facing each other to form a common outlet aperture substantially closed on the sides to allow cable passage therethrough.

2. The up-spout fitting of claim 1, wherein the top of the side walls include a mounting bracket on which another cable wiring duct system component can be mounted.

3. The up-spout fitting of claim 2, further comprising a cap attachable to the mounting bracket of at least one of the fitting sections to releaseably retain the fitting sections in a closed position.

4. The up-spout fitting of claim 3, wherein the cap includes a slotted opening on at least one side thereof.

5. The up-spout fitting of claim 4, wherein the slotted opening is at least the width of a cable designed to pass through the outlet aperture.

6. The up-spout fitting of claim 2, wherein the mounting bracket is located to allow mounting of another wiring duct system component in multiple orientations.

7. The up-spout fitting of claim 1, wherein the width of each fitting section substantially corresponds to the predetermined width of the duct section.

8. The up-spout fitting of claim 7, wherein a side opposite the one side having the hinge arrangement includes a hook that releaseably retains the opposite side on the duct section.

9. The up-spout fitting of claim 7, wherein a side opposite the one side having the hinge arrangement includes a latch.

10. The up-spout fitting of claim 1, wherein at least one of the side walls is radiused to provide bend radius control to wires passing through the outlet aperture.

11. The up-spout fitting of claim 1, wherein the hinge arrangement on the at least one side of the fitting section includes a curved hook element.

12. The up-spout fitting of claim 11, wherein the hinge arrangement further includes a tensioning rib inwardly spaced from the curved hook element.

13. The up-spout fitting of claim 1, wherein the side walls in each fitting section form an L-shaped opening.

14. The up-spout fitting of claim 1, wherein the side walls in each fitting section define half of the outlet aperture.

15. The up-spout fitting of claim 1, wherein the fitting sections are identical.

16. A method of mounting an up-spout fitting to a duct section of a cable wiring duct system, the duct section including a base wall and side walls that define a cable receiving channel therein, the side walls having a hinge arrangement thereon, the method comprising:
    mounting fitting halves of the up-spout fitting onto duct section side walls of at least one duct section of the cable wiring duct system;
    selectively opening individual ones of the two fitting halves by pivoting the individual ones about the hinge arrangement without interference with the other fitting half or cables located within the up-spout fitting to gain access to the cable receiving channel from either longitudinal side of the duct section; and returning the individual ones of the fitting halves to a closed position that covers the cable receiving channel.

17. The method of claim 16, further comprising:

providing the up-spout fitting with a fitting bracket at an outlet aperture of the fitting; and mounting a duct system accessory component onto the up-spout fitting bracket.

18. The method of claim 16, further comprising:
providing the up-spout fitting with a fitting bracket at an outlet aperture of the fitting; and
mounting a cap onto the up-spout fitting bracket.

19. The method of claim 18, wherein the cap has a slotted opening on at least one side thereof and the step of mounting is performed without removal of existing wires from the fitting by routing existing wires through the slotted opening.

20. The method of claim 16, further comprising mounting another wiring duct system component to an outlet aperture in one of several available orientations.

* * * * *